United States Patent Office 3,417,111
Patented Dec. 17, 1968

3,417,111
10-FORMYL FLUORIDE AND -ACETYL STEROIDS AND PROCESSES FOR THEIR PREPARATION
Lawrence H. Knox, deceased, late of Mexico City, Mexico, by Anne A. Knox, Mexico City, Mexico, assignor to Syntex Corporation, Panama, Panama, a corporation of Panama
No Drawing. Filed Mar. 29, 1966, Ser. No. 539,257
Claims priority, application Mexico, Apr. 2, 1965, 81,886
17 Claims. (Cl. 260—397.1)

This invention relates to novel steroids and to processes for their preparation.

More particularly, this invention is directed at 10-formyl fluoride androstanes and pregnanes (19-fluoro-19-keto derivatives). It is further directed at certain 10-acetyl-5α- and -5β-androstanes.

The compounds of the present invention may be represented by the following formula:

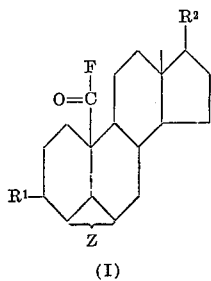

(I)

wherein $R^1$ is an oxygen atom or the group

in which $R^3$ is hydrogen or a hydrocarbon carboxylic acyl group; $R^2$ is an oxygen atom or the group

in which $R^4$ is hydrogen or a hydrocarbon carboxylic acyl group and $R^5$ is hydrogen, (lower)alkyl, (lower)alkenyl, or (lower)alkynyl; and Z is a carbon-carbon double bond between C–4 and C–5 or between C–5 and C–6 or a carbon-carbon single bond between each of C–4 and C–5 and C–5 and C–6. In the latter instance, the hydrogen bonded to C–5 will embrace both the α and β-configurations, collectively or singularly, and both such configurations are included herein.

The hydrocarbon carboxylic acyl groups of the present invention will contain less than 12 carbon atoms and may be of straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethyl acetate, t-butylacetate, phenoxyacetate, cyclopentylpropionate, aminoacetate and β-chloropropionate, adamantoate, and the like.

By the term "(lower)alkyl," and derivations thereof such as "(lower)alkenyl" and "(lower)alkynyl," is intended a branched or straight chain hydrocarbon group of six or less carbon atoms. Representations of such (lower)alkyl groups are thus methyl, ethyl, propyl, butyl, pentyl and hexyl; of such (lower)alkenyl groups are vinyl, propenyl and the like; and of such (lower)alkynyl groups are ethynyl, propynyl, and the like.

Of the above steroids, particularly valuable steroids are those represented by the following formulas:

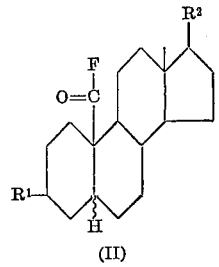

(II)

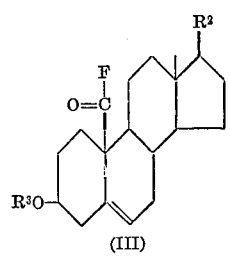

(III)

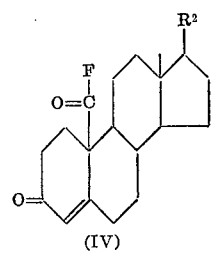

(IV)

wherein each of $R^1$, $R^2$, and $R^3$ are as hereinbefore represented.

The above compounds are anabolic agents with a favorable anabolic-androgenic ratio. In addition, they exhibit antiestrogenic, antigonadotrophic and antifibrillatory properties, lower the blood cholesterol level, and inhibit the activity of the pituitary gland. In addition, the 17α-alkenyl and alkylnyl substituted compounds possess progestational activity and are especially useful in the control and regulation of fertility and in the treatment of various menstrual disorders.

The process of this invention involves converting the 19-carboxylic acid starting steroids to the corresponding 10-formyl fluoride derivatives by treatment with an α-fluorinated amine of the formula

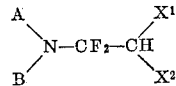

wherein each of A and B is alkyl of from 1 to 6 carbon atoms, or, when taken together, alkylene of from 5 to 7 carbon atoms inclusively; $X^1$ is chloro or fluoro; and $X^2$ is chloro, fluoro, or trifluoromethyl. Typical of such reactants are 1-diethylamino-1,1,2-trifluoro-2-chloroethane, 1-dimethylamino-1,1,2,2 - tetrafluoroethane, 1 - dipropylamino-1,1,2-trifluoro-2 - chloroethane, 1 - dimethylamino-1,1-difluoro-2,2-dichloroethane, 1-dimethylamino-1,1 - difluoro-2,2-dichloroethane, and the like. The reaction is generally conducted with approximately 1.5 molar equivalents of an α-fluorinated amine of the above indicated type, notably 1 - diethylamino - 1,1,2 - trifluoro-2-chloroethane, at about room temperature in an inert, nonpolar, organic solvent such as methylene chloride, acetonitrile, tetrahydrofuran, dioxane, benzene, toluene, xylene and the like for from 10 to 24 hours and, preferably, for about 16 hours. Thus provided thereby are the corresponding 10-formyl fluoride derivatives.

The 19-carboxylic acid steroids used as starting steroids in the above process belong to the androstane and pregnane series and may be saturated or unsaturated. The unsaturated compounds preferably possess a double bond at C–5 in the case of the 3-acyloxy compounds, or the 3-keto-$\Delta^4$ grouping. These starting steroids are obtained by oxidation of the corresponding 19-hydroxy compounds such as with chromic acid solution. Examples of suitable starting steriods for the present invention include:

5α-androstane-3,17-dion-19-oic acid,
5β-androstane-3,17-dion-19-oic acid,
3β-acetoxyandrost-5-en-17-on-19-oic acid,
androst-4-ene-3,17-dion-19-oic acid,
17α-methyl-17β-acetoxy-5α-androstan-3-on-19-oic acid,
17α-methyl-17β-acetoxy-5β-androstan-3-on-19-oic acid,
17α-vinyl-17β-acetoxy-5α-androstan-3-on-19-oic acid,
17α-ethynyl-17β-acetoxy-5α-androstan-3-on-19-oic acid,
17α-methyl-17β-acetoxyandrost-4-en-3-on-19-oic acid,
3β,17β-diacetoxy-17α-methylandrost-5-en-19-oic acid,
3β,17β-diacetoxy-17α-ethylandrost-5-en-19-oic acid,
  pregn-4-ene-3,20-dion-19-oic acid, and
17,20;20,21-bismethylenedioxypregn-4-en-3-on-19-oic acid.

The above described process is preferably terminal, that is, the appropriate substitution, as indicated by $R^1$, $R^2$, and Z in Formula I above, are ideally provided in the 19-carboxylic acid steroids before the processes of this invention are performed.

The 5α-androstane-3,17-dion-19-oic acid is obtained from the 3-acetate of androst-5-ene-3β,19-diol-17-one, which is oxidized to 3-acetoxyandrost-5-en-17-on-19-oic acid by reaction with 8 N chromic acid, the double bond is then hydrogenated in the presence of a palladium catalyst, the thus obtained 3-acetoxy-5α-androstan-17-on-19-oic acid is saponified, and the hydroxyl group at C–3 is finally oxidized to a keto group.

The 5β-androstane-3,17-dion-19-oic acid is similarly obtained from androst-4-en-19-ol-3,17-dione upon oxidation with chromic acid after hydrogenation of the double bond in the presence of a palladium catalyst and oxidation of the C–19 hydroxyl.

The androst-4-en-3-ones may be obtained by oxidation of the corresponding androst-5-ene-3β,17β-diols with aluminum isopropoxide in toluene solution in the presence of cyclohexanone.

After the 3-keto group, if present initially, is protected such as by forming a ketal thereof with ethylene glycol in the presence of oxalic acid and benzene or converting it to the 3β-acetate, the C–17 position may be further elaborated.

The 17-keto group may be treated with an organometallic such as alkyl lithium, alkenyl lithium, alkynyl lithium or alkyl magnesium halide, alkenyl magnesium halide, ar alkynyl magnesium halide which provides the corresponding 17α-aliphatic 17β-ols. The 17α-alkyl or -alkenyl group such as ethyl or vinyl may be alternatively provided through controlled hydrogenration of the 17α-alkynyl group such as ethynyl.

In lieu of the process described above, the 17-keto may be reduced such as by treatment with sodium borohydride in methanol or lithium aluminum hydride in tetrahydrofuran to give the corresponding 17β-hydroxy compound, unsubstituted in the 17α position.

The secondary 17β-hydroxyl group may be esterified by an acylating agent such as acetic anhydride or other anhydride in pyridine. Esterification of the tertiary 17β-hydroxyl group is done with an acylating agent such as acetic anhydride or other anhydride and acetic acid in the presence of strong acid such as p-toluenesulfonic acid and the like.

The protecting group at C–3 is removed in the usual manner such as by acidic treatment to afford the corresponding 3-keto compound, fully substituted at C–17 as provided above. The 3-keto group may be reduced as described above for the 17-keto and to give the corresponding 3β-hydroxy compound. Esterification as described hereinbefore for the secondary hydroxyl group gives the 3β-esters.

Alternatively, the 3β-ester may be provided as above before or simultaneously with further elaboration at C–17, after which it may be converted to a hydroxy group by hydrolysis which is oxidized to the 3-keto group.

Those compounds represented above by Formula I in addition to their biological activity, serve as intermediates for the preparation of the corresponding 10-acetyl (19-methyl-19-keto) derivatives. Especially useful therefor are those compounds represented by Formula II to thus give the 10-acetyl-5α- and -5β-androstanes. Such compounds exhibit similar activities as those listed above for the corresponding 10-formyl fluoride compounds.

In this aspect of the present invention, the 10-formyl fluoride (19-fluoro-19-keto) derivatives (II) are treated with methylmagnesium bromide in inert solvent at a temperature ranging from the room temperature and the reflux temperature of the solvent employed, preferably room temperature, for approximately one hour thus producing the corresponding 10-acetyl (19-methyl-19-keto) compounds.

Before such reaction with Grignard reagent is conducted, keto groups which may be present in the molecule, such as at C–3, C–17, and C–20, are selectively reduced without affecting the keto group at C–19 such as by employing sodium borohydride as reagent, in diglyme solution, at a temperature of approximately 0° C. and in the presence of borontrifluoride etherate. After the methyl group has been introduced, the compound may be oxidized with chromic acid solution to restore these corresponding keto groups.

The methylmagnesium bromide referred to above may be substituted by another Grignard reagent such as ethyl-, vinyl-, or ethynylmagnesium bromide obtaining as alternate products the respective 19-keto-19-alkyl, -alkenyl, or -alkynyl derivatives.

The following preparations and examples further illustrate the manner by which this invention may be practiced but they should not be construed as limiting the scope hereof except insofar as indicated by the appended claims.

PREPARATION 1

A solution of 1 g. of androst-4-en-19-ol-3,17-dione in 50 cc. of ethanol is hydrogenated in the presence of 1 g. of 5% palladium on charcoal catalyst under a pressure of 15 pounds, for 30 minutes. The catalyst is eliminated by filtration and the solvent evaporated to dryness. The residue is crystallized from acetone-hexane, thus producing 5β-androstan-19-ol-3,17-dione.

A solution of 1 g. of the foregoing compound in 10 cc. of acetone is cooled to 0° C. and then treated under an atmosphere of nitrogen and with stirring, with 20 ml. of a solution of 8 N chromic acid (prepared by mixing 26 g. of chromium trioxide with 23 cc. of concentrated sulfuric acid and diluting with water to 100 cc.). The reaction mixture is stirred for 2 hours further at room temperature, diluted with water, and extracted with ethyl acetate (3 portions of 200 cc. each). The organic extract is washed with a cold 5% potassium hydroxide solution. The cold alkaline extract is acidified with concentrated hydrochloric acid. The formed precipitate is filtered, washed with cold water to neutral, and dried. Crystallization from acetone-hexane affords 5β-androstane-3,17-dion-19-oic acid.

PREPARATION 2

In accordance with the oxidation method described in the preceding Preparation (last paragraph), 1 g. of the 3-acetate of androst-5-ene-3β,19-diol-17-one is converted into 3β-acetoxyandrost-5-en-17-on-19-oic acid.

A solution of 1 g. of 3β-acetoxyandrost-5-en-17-on-19-oic acid in 50 cc. of ethanol is hydrogenated in the presence of 1 g. of 5% palladium on charcoal catalyst, under a pressure of 50 pounds, for 30 minutes, and at room temperature. The catalyst is then eliminated by filtration and washed well with ethanol. The filtrate is evaporated to dryness thus giving 3β-acetoxy-5α-androstan-17-on-19-oic acid.

A solution of 1 g. of the foregoing compound in 125 cc. of methanol is saponified with 500 mg. of potassium hydroxide dissolved in 1 cc. of water, at room temperature for 16 hours. It is then poured into an aqueous hydrochloric acid solution, extracted with ethyl acetate and the organic extract washed with water to neutrality and dried, thus producing a crude compound which upon recrystallization from methylene chloride-ether affords 5α-androstan-3β-ol-17-on-19-oic acid.

Upon oxidation of the preceding compound with 8 N chromic acid, in accordance with the method described in Preparation 1 (second paragraph), but keeping the reaction for 5 minutes only, there is obtained 5α-androstan-3,17-dion-19-oic acid.

PREPARATION 3

A solution of 1 g. of 3β-acetoxy-5α-androstan-17-on-19-oic acid in 50 cc. of thiophene-free benzene is treated with 5.5 cc. of 4 N methylmagnesium bromide in ether and the mixture refluxed with the exclusion of moisture for 3 hours. The cooled mixture is cautiously treated with excess aqueous ammonium chloride solution and the product isolated by ethyl acetate extraction. The extract is washed with water, dried over anhydrous sodium sulfate and evaporated to dryness.

Recrystallization from methylene chloride-hexane affords 17α-methyl-5α-androstane-3β,17β-diol-19-oic acid. In a similar manner but using ethyl, vinyl and ethynyl magnesium bromide as reagents there are respectively obtained:

17α-ethyl-5α-androstane-3β,17β-diol-19-oic acid,
17α-vinyl-5α-androstane-3β,17β-diol-19-oic acid, and
17α-ethynyl-5α-androstane-3β,17β-diol-19-oic acid.

PREPARATION 4

To a solution of 2 g. of 17α-methyl-5α-androstane-3β,17β-diol-19-oic acid in 40 cc. of anhydrous benzene there are added 0.4 g. of p-toluenesulfonic acid and 4 cc. of acetic anhydride. The mixture is allowed to stand for 24 hours at room temperature, poured into ice and water, and the resulting mixture stirred to effect hydrolysis of the excess anhydride. The benzene layer is separated and washed with water to neutrality. Drying, evaporation and crystallization of the residue from acetone-hexane produces 3β,17β-diacetoxy-17α-methyl-5α-androstan-19-oic acid.

A solution of 1 g. of 3β,17β-diacetoxy-17α-methyl-5α-androstan-19-oic acid in 50 cc. of methanol is treated with 500 mg. of potassium hydroxide dissolved in 1 cc. of water, and the mixture is allowed to stand at room temperature for 4 hours; it is then poured into an aqueous hydrochloric acid solution and extracted with ethyl acetate. The organic extract is washed with water, dried over anhydrous sodium sulfate and evaporated to dryness. Crystallization from methylene chloride-ether affords 17α-methyl-17β-acetoxy-5α-androstan-3β-ol-19-oic acid.

The foregoing compound is dissolved in 10 cc. of acetone and treated dropwise with an 8 N solution of chromic acid, at a temperature of about 20° C., until the color of the reagent persists in the mixture. The reaction mixture is kept at room temperature for 10 minutes longer, poured into ice water and the formed precipitate filtered off, washed with water and recrystallized from acetone-hexane, thus giving 17α-methyl-17β-acetoxy-5α-androstan-3-on-19-oic acid.

In the same manner, the other compounds obtained in Preparation 3 (last paragraph) provide as final products: 17α-ethyl-17β-acetoxy-5α-androstan-3-on-19-oic acid, 17α-vinyl-17β-acetoxy-5α-androstan-3-on-19-oic acid, and 17α-ethynyl - 17β - acetoxy-5α-androstan-3-on-19-oic acid, respectively.

PREPARATION 5

Preparation 3 is repeated but using 3β-acetoxyandrost-5-en-17-on-19-oic acid as starting material, yielding as products 17α-methylandrost-5-ene-3β,17β-diol-19-oic acid, 17α-ethylandrost-5-ene-3β,17β-diol-19-oic acid, 17α-vinyl-androst-5-ene-3β, 17β-diol-19-oic acid, and 17α-ethynylandrost-5-ene-3β,17β-diol-19-oic acid.

Upon esterification of these compounds with acetic anhydride in benzene solution and in the presence of p-toluenesulfonic acid, in accordance with the method described in Preparation 4, there are obtained the corresponding 3β,17β-diacetoxy derivatives.

PREPARATION 6

A solution of 1 g. of 17α-methylandrost-5-ene-3β,17β-diol-19-oic acid in 80 cc. of toluene and 20 cc. of cyclohexanone is dried by distilling off 10 cc. of the solvent. A solution of 1 g. of aluminum isopropoxide dissolved in 7 cc. of anhydrous toluene is then added and the mixture is refluxed for 45 minutes. It is then acidified with hydrochloric acid and the solvents removed by steam distillation. The product is extracted several times with ethyl acetate and the organic extracts washed with water until neutral, dried over anhydrous sodium sulfate and evaporated to dryness. Crystallization from acetone-hexane affords the 17α-methylandrost-4-en - 17β-ol-3-on-19-oic acid.

Esterification of this compound with acetic anhydride in benzene solution and in the presence of p-toluenesulfonic acid, in accordance with the method described in Preparation 4, yields 17α-methyl-17β-acetoxyandrost-4-en-3-on-19-oic acid.

In a similar maner, from 17α-ethylandrost-5-ene-3β-17β-diol-19-oic acid, 17α-vinylandrost-5-ene-3β,17β-diol-19-oic acid, and 17α-ethynylandrost - 5-ene-3β,17β-diol-19-oic acid there are obtained as final products: 17α-ethyl - 17β-acetoxyandrost - 4-en-3-on-19-oic acid, 17α-vinyl - 17β-acetoxyandrost - 4-en-3-on-19-oic acid, and 17α - ethynyl - 17β - acetoxyandrost - 4-en - 3 - on-19-oic acid, respectively.

PREPARATION 7

Preparation 1 is repeated but using 17α-methylandrost-4-ene-17β,19-diol-3-one as starting material, thus producing successively 17α - methyl-5β-androstane-17β,19-diol-3-one, and 17α-methyl-5β-androstan - 17β-ol-3-on-19-oic acid.

This latter compound is treated with acetic anhydride in benzene solution and in the presence of p-toluenesulfonic acid, in accordance with the method described in Preparation 4, to give 17α - methyl - 17β-acetoxy-5β-androstan-3-on-19-oic acid.

Example 1

To a cold and stirred solution of 10 g. of 5β-androstane-3,17-dion-19-oic acid in 200 cc. of anhydrous tetrahydrofuran there is added 9 g. of 1-diethylamino-1,1,2-trifluoro-2-chloroethane. The reaction mixture is allowed to stand at 0–5° C. for 1 hour, and at room temperature for another hour. The solvent is distilled under vacuo at room temperature, and the oily residue is extracted with 4 portions of hot hexane. Evaporation of the hexane from the organic extracts and recrystallization of the residue from acetone-hexane affords 19-fluoro-5β-androstane-3,17,19-trione.

By following the same method, the compounds mentioned under I are converted into the products under II:

| I | II |
|---|---|
| 5α-androstane-3,17-dion-19-oic acid. | 19-fluoro-5α-androstane-3,17-19-trione. |
| 3β-acetoxyandrost-5-en-17-on-19-oic acid. | 3β-acetoxy-19-fluoroandrost-5-ene-17,19-dione. |
| Androst-4-ene-3,17-dion-19-oic acid. | 19-fluoroandrost-4-ene-3,17,19-trione. |
| 17α-methyl-17β-acetoxy-5β-androstan-3-on-19-oic acid. | 17α-methyl-17β-acetoxy-19-fluoro-5β-androstane-3,19-dione. |
| 17α-methyl-17β-acetoxy-5α-androstan-3-on-19-oic acid. | 17α-methyl-17β-acetoxy-19-fluoro-5α-androstane-3,19-dione. |
| 17α-ethyl-17β-acetoxy-5α-androstan-3-on-19-oic acid. | 17α-ethyl-17β-acetoxy-19-fluoro-5α-androstane-3,19-dione. |
| 17α-vinyl-17β-acetoxy-5α-androstan-3-on-19-oic acid. | 17α-vinyl-17β-acetoxy-19-fluoro-5α-androstane-3,19-dione. |
| 17α-ethynyl-17β-acetoxy-5α-androstan-3-on-19-oic acid. | 17α-ethynyl-17β-acetoxy-19-fluoro-5α-androstane-3,19-dione. |
| 3β,17β-diacetoxy-17α-methyl-androst-5-en-19-oic acid. | 3β,17β-diacetoxy-17α-methyl-19-fluoroandrost-5-en-19-one. |
| 3β,17β-diacetoxy-17α-ethyl-androst-5-en-19-oic acid. | 3β,17β-diacetoxy-17α-ethyl-19-fluoroandrost-5-en-19-one. |
| 3β,17β-diacetoxy-17α-vinyl-androst-5-en-19-oic acid. | 3β,17β-diacetoxy-17α-vinyl-19-fluoroandrost-5-en-19-one. |
| 3β,17β-diacetoxy-17α-ethynyl-androst-5-en-19-oic acid. | 3β,17β-diacetoxy-17α-ethynyl-19-fluoroandrost-5-en-19-one. |
| 17α-methyl-17β-acetoxy-androst-4-en-3-on-19-oic acid. | 17α-methyl-17β-acetoxy-19-fluoroandrost-4-ene-3,19-dione. |
| 17α-ethyl-17β-acetoxy-androst-4-en-3-on-19-oic acid. | 17α-ethyl-17β-acetoxy-19-fluoroandrost-4-ene-3,19-dione. |
| 17α-vinyl-17β-acetoxy-androst-4-en-3-on-19-oic acid. | 17α-vinyl-17β-acetoxy-19-fluoroandrost-4-ene-3,19-dione. |
| 17α-ethynyl-17β-acetoxy-androst-4-en-3-on-19-oic acid. | 17α-ethynyl-17β-acetoxy-19-fluoroandrost-4-ene-3,19-dione. |

Example 2

To a solution of 750 mg. of sodium borohydride in 125 cc. of diglyme cooled to 0° C., there is added dropwise and under stirring, in a 20-minute period, a solution of 5 g. of 19-fluoro-5β-androstane-3,17,19-trione in 500 cc. of anhydrous ether and 80 cc. of borontrifluoride etherate. The mixture is stirred for an hour at 0–5° C., and an hour longer at room temperature. There are then added 150 cc. of 2% hydrochloric acid and then 150 cc. of water. The organic layer is separated and the aqueous layer extracted with ether. The combined organic extract is washed with 5% sodium bicarbonate solution and water to neutral, and dried over anhydrous sodium sulfate. Upon evaporation of the solvent there is obtained an oil which is recrystallized from methanol-ether thus giving 19-fluoro-5β-androstane-3β,17β-diol-19-one.

Example 3

A solution of 1 g. of 19-fluoro-5β-androstane-3β,17β-diol-19-one in a mixture of 100 cc. of ether and 40 cc. of tetrahydrofuran is added dropwise, under stirring and at room temperature, to 180 cc. of a 0.67 N methylmagnesium bromide solution, in a 30-minute period, and the reaction mixture is stirred for an additional 30 minutes. The complex thus formed is destroyed by adding a saturated sodium sulfate solution and then solid sodium sulfate. The insoluble material is filtered and the filtrate extracted with ethyl acetate. The extract is washed with water, dried over anhydrous sodium sulfate and evaporated to dryness. Crystallization from acetone affords 19-methyl-5β-androstane-3β,17β-diol-19-one.

Example 4

A stirred solution of 500 mg. of 19-methyl-5β-androstane-3β,17β-diol-19-one in 25 cc. of pure acetone was oxidized with 1 ml. of an 8 N solution of chromic acid, at room temperature. After 5 minutes, the mixture is poured into water and the product isolated by extraction with ethyl acetate. The extract is washed with water to neutral, dried over anhydrous sodium sulfate and the solvent evaporated. Upon crystallization of the residue from acetone there is obtained 19-methyl-5β-androstane-3,17,19-trione.

Example 5

Example 1 is repeated using methylene chloride as solvent, producing the same results.

Example 6

In accordance with the method described in Example 2, the compounds listed under I are converted into the products listed under II:

| I | II |
|---|---|
| 19-fluoro-5α-androstane-3,17,19-trione. | 19-fluoro-5α-androstane-3β,17β-diol-19-one. |
| 3β-acetoxy-19-fluoro-androst-5-ene-17,19-dione. | 19-fluoroandrost-5-ene-3β,17β-diol-19-one. |
| 19-fluoroandrost-4-ene-3,17,19-trione | 19-fluoroandrost-4-ene-3β,17β-diol-19-one. |
| 17α-methyl-17β-acetoxy-19-fluoro-5β-androstane-3,19-dione. | 17α-methyl-19-fluoro-5β-androstane-3β,17β-diol-19-one. |
| 17α-methyl-17β-acetoxy-19-fluoro-5α-androstane-3,19-dione. | 17α-methyl-19-fluoro-5α-androstane-3β,17β-diol-19-one. |
| 17α-ethyl-17β-acetoxy-19-fluoro-5α-androstane-3,19-dione. | 17α-ethyl-19-fluoro-5α-androstane-3β,17β-diol-19-one. |
| 17α-vinyl-17β-acetoxy-19-fluoro-5α-androstane-3,19-dione. | 17α-vinyl-19-fluoro-5α-androstane-3β,17β-diol-19-one. |
| 17α-ethynyl-17β-acetoxy-19-fluoro-5α-androstane-3,19-dione. | 17α-ethynyl-19-fluoro-5α-androstane-3β,17β-diol-19-one. |
| 3β,17β-diacetoxy-17α-methyl-19-fluoroandrost-5-en-19-one. | 17α-methyl-19-fluoroandrost-5-ene-3β,17β-diol-19-one. |
| 3β,17β-diacetoxy-17α-ethyl-19-fluoroandrost-5-en-19-one. | 17α-ethyl-19-fluoroandrost-5-ene-3β,17β-diol-19-one. |
| 3β,17β-diacetoxy-17α-vinyl-19-fluoroandrost-5-en-19-one. | 17α-vinyl-19-fluoroandrost-5-ene-3β,17β-diol-19-one. |
| 3β,17β-diacetoxy-17α-ethynyl-19-fluoroandrost-5-en-19-one. | 17α-ethynyl-19-fluoroandrost-5-ene-3β,17β-diol-19-one. |
| 17α-methyl-17β-acetoxy-19-fluoroandrost-4-ene-3,19-dione. | 17α-methyl-19-fluoroandrost-4-ene-3β,17β-diol-19-one. |
| 17α-ethyl-17β-acetoxy-19-fluoroandrost-4-ene-3,19-dione. | 17α-ethyl-19-fluoroandrost-4-ene-3β,17β-diol-19-one. |
| 17α-vinyl-17β-acetoxy-19-fluoroandrost-4-ene-3,19-dione | 17α-vinyl-19-fluoroandrost-4-ene-3β,17β-diol-19-one. |
| 17α-ethynyl-17β-acetoxy-19-fluoroandrost-4-ene-3,19-dione. | 17α-ethynyl-19-fluoroandrost-4-ene-3β,17β-diol-19-one. |

Example 7

A solution of 1 g. of 3β,17β-diacetoxy-19-fluoro-17α-methylandrost-5-ene-19-one in 50 ml. of thiophene-free benzene is treated with 6 ml. of 4 N methylmagnesium bromide in ether and the mixture refluxed with the exclusion of moisture for 1 hour. The cooled mixture is cautiously treated with excess aqueous ammonium chloride solution and the product isolated by ethyl acetate extraction. The extract is washed with water, dried over anhydrous sodium sulfate and evaporated to dryness.

Recrystallization from acetone-hexane affords 17α,19-dimethylandrost-5-ene-3β,17β-diol-19-one.

In a similar manner from 3β,17β-diacetoxy-17α-ethyl-19-fluoroandrost-5-en-19-one, 3β,17β-diacetoxy-17α-vinyl-19-fluoroandrost-5-en-19-one, and 3β,17β-diacetoxy-17α-ethynyl-19-fluoroandrost-5-en-19-one there are respectively obtained 17α-ethyl-19-methylandrost-5-ene-3β,17β-diol-19-one, 17α-vinyl-19-methylandrost-5-ene - 3β,17β-diol-19-one, and 17α - ethynyl-19-methylandrost-5-ene-3β,17β-diol-19-one.

Example 8

In accordance with the method described in Example 3 the products obtained in Example 6 are respectively converted to:

19-methyl-5α-androstan-3β,17β-diol-19-one,
19-methylandrost-5-ene-3β,17β-diol-19-one,
19-methylandrost-4-ene-3β,17β-diol-19-one,
17α,19-dimethyl-5β-androstane-3β,17β-diol-19-one,
17α,19-dimethyl-5α-androstane-3β,17β-diol-19-one,
17α-ethyl-19-methyl-5α-androstane-3β,17β-diol-19-one,
17α-vinyl-19-methyl-5α-androstane-3β,17β-diol-19-one,
17α-ethynyl-19-methyl-5α-androstane-3β,17β-diol-19-one,
17α,19-dimethylandrost-5-ene-3β,17β-diol-19-one,
17α-ethyl-19-methylandrost-5-ene-3β,17β-diol-19-one,
17α-vinyl-19-methylandrost-5-ene-3β,17β-diol-19-one,
17α-ethynyl-19-methylandrost-5-ene-3β,17β-diol-19-one,
17α,19-dimethylandrost-4-ene-3β,17β-diol-19-one,
17α-ethyl-19-methylandrost-4-ene-3β,17β-diol-19-one,
17α-vinyl-19-methylandrost-4-ene-3β,17β-diol-19-one, and
17α-ethynyl-19-methylandrost-4-ene-3β,17β-diol-19-one.

Example 9

In accordance with the method descirbed in Example 4, the compounds listed under I are treated with chromic anhydride, to convert them to the products listed under II:

| I | II |
|---|---|
| 19-methyl-5α-androstane-3β,17β-diol-19-one. | 19-methyl-5α-androstane-3,17,19-trione. |
| 17α,19-dimethyl-5β-androstane-3β,17β-diol-19-one. | 17α,19-dimethyl-5β-androstan-17β-ol-3,19-dione. |
| 17α,19-dimethyl-5α-androstane-3β,17β-diol-19-one. | 17α,19-dimethyl-5α-androstan-17β-ol-3,19-dione. |
| 17α-ethyl-19-methyl-5α-androstane-3β,17β-diol-19-one. | 17α-ethyl-19-methyl-5α-androstan-17β-ol-3,19-dione. |
| 17α-vinyl-19-methyl-5α-androstane-3β,17β-diol-19-one. | 17α-vinyl-19-methyl-5α-androstan-17β-ol-3,19-dione. |
| 17α-ethynyl-19-methyl-5α-androstane-3β,17β-diol-19-one. | 17α-ethynyl-19-methyl-5α-androstan-17β-ol-3,19-dione. |

Example 10

A solution of 500 mg. of 19 - methylandrost-5-ene-3β,17β-diol-19-one in 40 cc. of toluene and 10 cc. of cyclohexanone is dried by distilling 5 ml. of the solvent. A solution of 500 mg. of aluminum isopropoxide dissolved in 4 ml. of anhydrous toluene is then added and the mixture is refluxed for 45 minutes. Two milliliters of acetic acid are added and the solvents removed by steam distillation. The product is extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane affords 19-methylandrost-4-ene-3,17,19-trione.

In a similar manner, from 17α,19-dimethylandrost-5-ene-3β,17β - diol-19-one, 17α-ethyl-19-methylandrost-5-ene-3β,17β-diol-19-one, 17α - vinyl-19-methylandrost-5-ene-3β,17β-diol-19-one, and 17α - ethynyl - 19 - methyl-androst-5-ene-3β,17β - diol-19-one there are respectively obtained 17α,19-dimethylandrost-4-en-17β-ol-3,19-dione, 17α-ethyl-19-methylandrost-4-ene-17β-ol-3,19 - dione, 17α-vinyl-19-methylandrost-4-ene-17β-ol-3,19-dione, and 17α-ethynyl-19-methylandrost-4-en-17β-ol-3,19-dione.

Example 11

A mixture of 1 g. of 17α,19-dimethylandrost-4-ene-3,17β-diol-19-one in 20 cc. of dioxane, and 1.1 molar equivalents of 2,3-dichloro-5,6-dicyano-1,4-benzoquinone is kept at room temperature overnight. The hydroquinone formed during the reaction is filtered and the filtrate evaporated to dryness. The residue is dissolved in acetone and filtered through 20 g. of alumina. Crystallization from acetone-hexane gives 17α,19-dimethylandrost-4-en-17β-ol-3,19-dione, identical to the obtained in the preceding example.

By the same method, 19 - methylandrost-4-ene-3,17β-diol-19-one and 19-fluoroandrost-4-ene-3,17β-diol-19-one are converted respectively to 19-methylandrost-4-en-17β-ol-3,19-dione and 19 - fluoroandrost-4-en-17β-ol - 3,19-dione.

Example 12

A mixture of 1 g. of 19-fluoroandrost-4-en-17β-ol-3,19-dione, 4 cc. of pyridine, and 4 cc. of acetic anhydride is kept at room temperature overnight and then poured into ice water. The formed precipitate is filtered, washed with water and dried. Crystallization from acetone-hexane gives 17β-acetoxy-19-fluoroandrost-4-ene-3,19,dione.

In the same manner but using propionic, caproic, and cyclopentylpropionic anhydrides as esterifying agents, there are obtained the 17β-propionate, caproate, and cyclopentylpropionate esters of 19-fluoroandrost-4-en-17β-ol-3-,19-dione. Likewise, 19-fluoro-5β-androstane-3,17β-diol-19-one is converted into its diacetate, dipropionate, dicaproate, and dicyclopentylpropionate.

Example 13

By following the method described in Example 11, 17α-methyl-19-fluoroandrost - 4 - ene - 3,17β-diol-19-one, 17α-vinyl-19-fluoroandrost - 4 - ene - 3,17β-diol-19-one, and 17α-ethynyl-19-fluoroandrost - 4 - ene - 3,17β-diol-19-one are converted respectively into 17α-methyl-19-fluoroandrost-4-en-17β-ol-3,19-dione, 17α - vinyl-19-fluoroandrost-4-en-17β-ol-3,19-dione, and 17α-ethynyl-19-fluoroandrost-4-en-17β-ol-3,19-dione.

Example 14

To a solution of 1 g. of 17α-methyl-19-fluoroandrost-4-en-17β-ol-3,19-dione in 20 ml. of anhydrous benzene there are added 200 mg. of p-toluenesulfonic acid and 2 cc. of acetic anhydride and the mixture is allowed to stand for 24 hours at room temperature. It is then poured into an ice and water mixture and the resulting mixture stirred to effect hydrolysis of the excess anhydride. The benzene layer is separated and washed with 10% sodium carbonate solution and water. Drying, evaporation, and crystallization of the residue from ether-hexane produces 17α-methyl-17β-acetoxy-19-fluoroandrost-4-ene-3,19-dione.

By the same method, 19-fluoro-17α-ethynylandrost-4-en-17β-ol-3,19-dione is converted into its 17β-acetate.

Example 15

In accordance with the methods described in Examples 1, 2, 3, and 4, starting from pregn-4-ene-3,20-dion-19-oic acid, (obtained by oxidation of 19-hydroxyprogesterone with 8 N chromic acid, for a prolonged period of time) there are successively obtained: 19-fluoropregn-4-ene-3,19,20-trione, 19-fluoropregn-4-ene-3,20-diol-19-one, 19-methylpregn-4-ene-3,20-diol-19-one, and 19 - methylpregn-4-ene-3,19,20-trione.

In a similar manner, from 3-keto-17,20;20,21-bis-methylenedioxypregn-4-en-19-oic acid (obtained by oxidation of 17,20;20,21-bismethylenedioxypregn-4-en-19-ol-3-one), there are successively obtained: 19-fluoro-17,20; 20-21-bismethylenedioxypregn-4-ene-3,19-dione, 19 - fluoro-17,20;20,21-bismethylenedioxypregn-4-en-3 - ol - 19 - one, 19-ethyl-17,20;20,21-bismethylenedioxypregn - 4 - en-3-ol-19-one, and 19 - methyl-17,20;20,21-bismethylenedioxypregn-4-ene-3,19-dione.

What is claimed is:

1. Steroids of the formula:

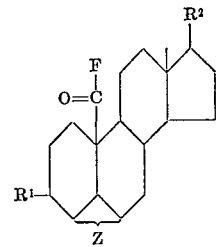

wherein $R^1$ is an oxygen atom or the group

in which $R^3$ is hydrogen or a hydrocarbon carboxylic acyl group; $R^2$ is an oxygen atom or the group

in which $R^4$ is hydrogen or a hydrocarbon carboxylic acyl group and $R^5$ is hydrogen, (lower)alkyl, (lower)alkenyl, or (lower)alkynyl; and Z is a carbon-carbon double bond between C–4 and C–5 or between C–5 and C–6 or a carbon-carbon single bond between each of C–4 and C–5 and C–5 and C–6.

2. Steroids of claim 1 wherein Z is a carbon-carbon single bond between each of C–4 and C–5 and C–5 and C–6.

3. A steroid of claim 2 wherein each of $R^1$ and $R^2$ is an oxygen atom.

4. A steroid of claim 2 wherein $R^1$ is the

group and $R^2$ is the group

5. Steroids of claim 1 wherein $R^1$ is the group

and Z is a carbon-carbon double bond between C–5 and C–6.

6. A steroid of claim 5 wherein $R^2$ is the group

7. A steroid of claim 5 wherein $R^2$ is the group

8. A steroid of claim 5 wherein $R^2$ is the group

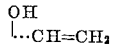

9. A steroid of claim 5 wherein $R^2$ is the

group.

10. A steroid of claim 1 wherein $R^1$ is a oxygen atom and Z is a carbon-carbon double bond between C–4 and C–5.

11. A steroid of claim 10 wherein $R^2$ is the group

12. A steroid of claim 10 wherein $R^2$ is the group

13. A steroid of claim 10 wherein $R^2$ is the group

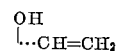

14. A steroid of claim 10 wherein $R^2$ is the group

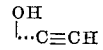

15. Steroids of the formula:

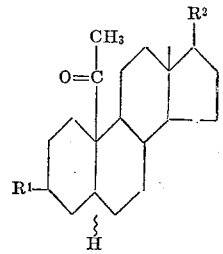

wherein $R^1$ is an oxygen atom or the group

in which $R^3$ is hydrogen or a hydrocarbon carboxylic acyl group and $R^2$ is an oxygen atom or the group

in which $R^4$ is hydrogen or a hydrocarbon carboxylic acyl group and $R^5$ is hydrogen, (lower)alkyl, (lower)alkenyl, (lower)alkynyl.

16. A steroid of claim 15 wherein each of $R^1$ and $R^2$ is an oxygen atom.

17. A steroid of claim 15 wherein $R^1$ is an oxygen atom and $R^2$ is the group

References Cited

UNITED STATES PATENTS 3,257,430  6/1966  Bowers et al.

H. A. FRENCH, *Primary Examiner.*

U.S. Cl. X.R.

260—397.3, 397.4; 167—65, 74